United States Patent [19]
Suzuki et al.

[11] Patent Number: 6,002,995
[45] Date of Patent: *Dec. 14, 1999

[54] APPARATUS AND METHOD FOR DISPLAYING CONTROL INFORMATION OF CAMERAS CONNECTED TO A NETWORK

[75] Inventors: Kazuko Suzuki, Kawasaki; Tomoaki Kawai, Yokohama, both of Japan

[73] Assignee: Canon Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/766,107

[22] Filed: Dec. 16, 1996

[30] Foreign Application Priority Data

Dec. 19, 1995 [JP] Japan .................................. 7-330869

[51] Int. Cl.⁶ .............................. H04N 1/42; H04N 5/232
[52] U.S. Cl. ........................ 702/188; 348/143; 348/211; 348/552
[58] Field of Search ................................... 364/550, 146; 345/112, 113, 115, 326, 327, 329, 334, 339, 348, 379; 348/61, 13–15, 143, 211, 239, 552; 455/67.1, 67.2, 66; 395/200.34; 702/188

[56] References Cited

U.S. PATENT DOCUMENTS

| | | | |
|---|---|---|---|
| 4,992,866 | 2/1991 | Morgan | 358/108 |
| 4,995,071 | 2/1991 | Weber et al. | 379/53 |
| 5,182,641 | 1/1993 | Diner et al. | 358/103 |
| 5,600,368 | 2/1997 | Matthews, III | 348/143 |
| 5,652,849 | 7/1997 | Conway et al. | 395/327 |
| 5,657,246 | 8/1997 | Hogan et al. | 348/515 |
| 5,677,709 | 10/1997 | Miura et al. | 345/161 |
| 5,684,514 | 11/1997 | Branscomb | 345/185 |
| 5,745,161 | 4/1998 | Ito | 348/15 |

FOREIGN PATENT DOCUMENTS

| | | | |
|---|---|---|---|
| 0 513 601 A1 | 11/1992 | European Pat. Off. | G08B 13/196 |
| 6-96378 | 4/1994 | Japan | G08B 23/00 |

*Primary Examiner*—Patrick Assouad
*Attorney, Agent, or Firm*—Fitzpatrick, Cella, Harper & Scinto

[57] ABSTRACT

Apparatus and method for displaying control information of a plurality of cameras connected to a network includes structure and steps for: displaying a map showing locations at which the plurality of cameras are disposed; and displaying symbols representing the cameras in accordance with the locations at which the cameras are disposed so that the symbols overlap with the displayed map, while displaying symbols in different forms in accordance with different conditions of the cameras.

35 Claims, 11 Drawing Sheets

APPARATUS AND METHOD FOR DISPLAYING CONTROL INFORMATION OF CAMERAS CONNECTED TO A NETWORK

BACKGROUND OF THE INVENTION

1. Field of the Invention

This invention relates to a control system for cameras connected to a network.

2. Description of the Related Art

There is a known camera control system capable of operating one monitoring camera or a plurality of monitoring cameras by remote control from a distant place. Such monitoring cameras vary from a type in which a camera is fixed on a table so as to be always directed in one direction to a type in which a camera can pan, tilt, and zoom by external control. The latter commonly includes the function of changing both the direction of photographing and magnification by remote control from a monitoring center.

When a plurality of cameras are operated by remote control, where and in which direction the respective cameras are installed need to be indicated to the operator. For example, for a monitoring system in which many cameras are installed in a store, a factory or a building, a camera information display system has been proposed. In such a camera information display system, figures representing the cameras are displayed at the appropriate positions in accordance with the respective cameras so that the figures overlap with an installation position map.

According to the camera information display system, the user as an observer can visually understand the location of the camera being operated. However, the above system hardly provides the user with sufficient displayed camera information.

For example, although the user can recognize the location(s) of the camera(s) being controlled on the map, the user cannot easily understand from which camera one image on the display screen is sent or from which cameras a plurality of images on the display screen are sent, based on the displayed information on the map.

In addition, in the above system the user cannot easily recognize on the map whether or not the camera(s) can be externally controlled with respect to photographing conditions such as panning, tilting and zooming.

Further, conventionally, one communication terminal is connected to at least one camera, and an image taken by a selected camera is transmitted, or images (or a composite image) taken by selected cameras are transmitted, to the monitoring controller of a monitoring center through a computer network. The above system has no means for using the map to recognize whether the cameras are connected to the same communication terminal. For example, in connection with switching over cameras connected to the same communication terminal, if the user can utilize a video display window that is assigned to the communication terminal without changing the window, troublesome or time-consuming operations (such as switching over the video display window to another window or creating a new window) can be eliminated because the user immediately understands whether or not a desired image can be obtained from a different camera connected to the same communication terminal. Accordingly, the user would experience improved operability.

SUMMARY OF THE INVENTION

Accordingly, it is an object of the present invention to provide a camera information display apparatus that satisfies these issues or demands.

In other words, it is another object of the present invention to provide a camera information display apparatus by which a displayed image or images and the relationship thereof to a camera or cameras as the origin can be readily recognized.

It is a further object of the present invention to provide a camera information display apparatus by which whether each camera can be externally controlled can be recognized.

It is a still further object of the present invention to provide a camera information display apparatus by which a camera or cameras connected to the same communication terminal can be easily recognized.

In accordance with an aspect of the present invention, the foregoing objects are achieved through the provision of a system for controlling a plurality of cameras connected to a network and for displaying an image from the camera or images from the cameras, the system including: map display means for displaying the locations at which the cameras are installed; symbol display means for displaying symbols representing the respective cameras in accordance with the locations at which the cameras are installed so that the symbols overlap with the map displayed by the map display means; and control means for controlling the symbol display means to display the symbols so as to be in different conditions in accordance with the conditions of the cameras corresponding to the symbols.

In accordance with another aspect of the present invention, the foregoing objects are achieved through the provision of a method for assisting control of a plurality of cameras connected to a network, comprising the steps of: displaying the locations at which the plurality of cameras are installed; and displaying symbols representing the respective cameras in accordance with the locations at which the cameras are installed so that the symbols overlap with the map displayed by map display means, while displaying the symbols in different conditions in accordance with the conditions of the cameras.

In accordance with a further aspect of the present invention, the foregoing objects are achieved through the provision of a medium in which programs for controlling a plurality of cameras connected to a network are recorded, the programs being used for displaying the locations at which the plurality of cameras are installed, and for displaying symbols representing the respective cameras in accordance with the locations at which the cameras are installed so that the symbols overlap with the map displayed by map display means, and for displaying the symbols in different conditions in accordance with the conditions of the cameras corresponding to the symbols.

Other objects and features of the present invention will be apparent from the following description and the attached drawings.

DESCRIPTION OF THE PREFERRED EMBODIMENTS

By referring to the attached drawings, embodiments of the present invention will be described below.

Figure 1:
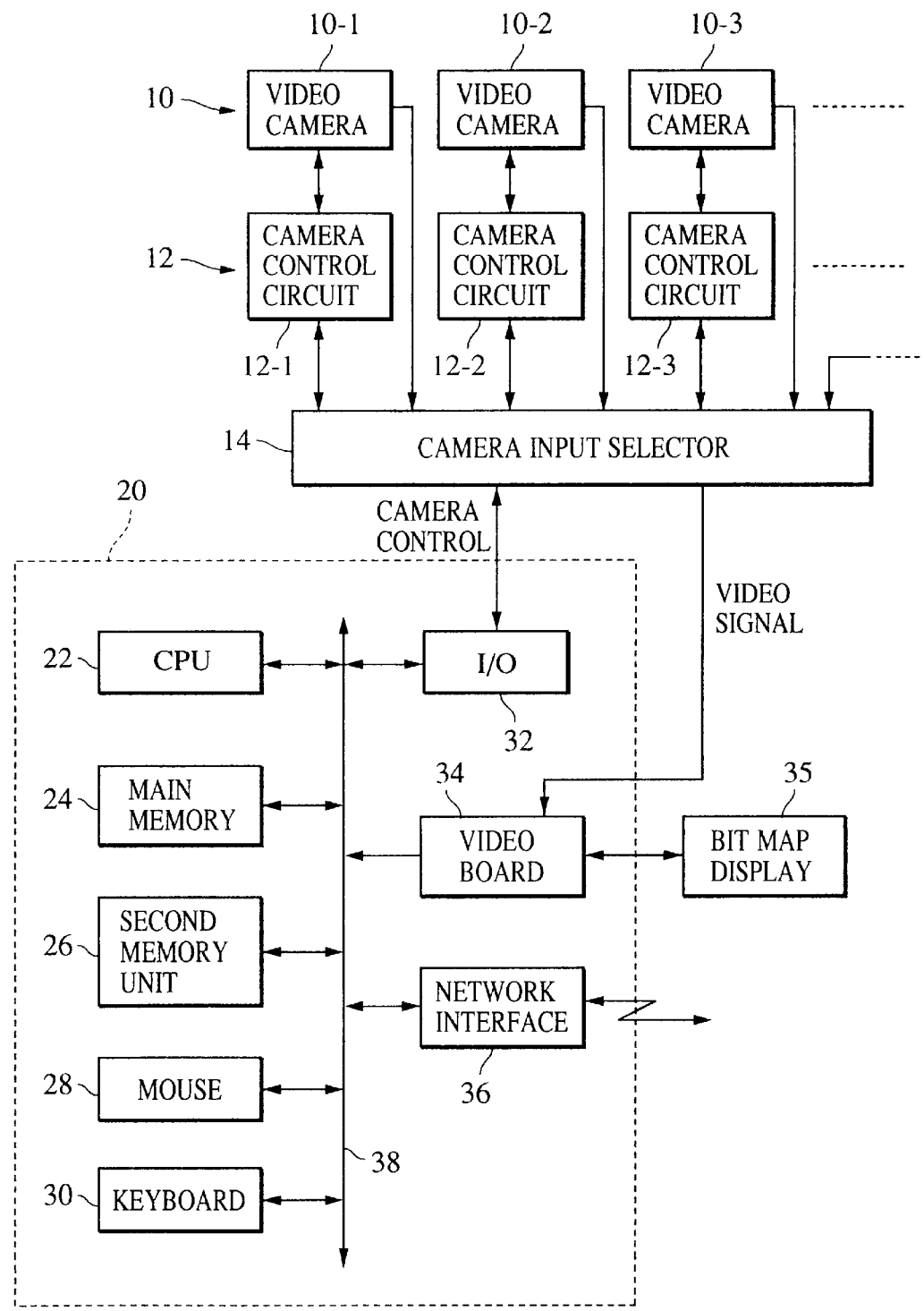
FIG. 1 is a block diagram showing a video communication terminal apparatus (video transmission-reception apparatus) according to an embodiment of the present invention.

In accordance with an embodiment of the present invention, a plurality of video communication terminals (substantially computers having the function of video communication) which connect with one camera device or a plurality of camera devices are connected to a computer network. Any of the communication terminals or an exclusive computer displays an image from a selected camera device or images from selected camera devices, and operates each camera device by remote control. FIG. 1 shows the schematic block diagram of a typical example of the plurality of video communication terminals which connect with the one camera device or a plurality of camera devices.

Camera control circuits 12-1 to 12-3 directly control video cameras 10-1 to 10-3 to pan, tilt, zoom, adjust focuses, adjust exposure, and perform other operations, in accordance with external control signals. A camera input selector 14 selects which of the video cameras 10-1 to 10-3 to control, in order to take in an output signal from the selected camera (the output signal is normally a video signal, but both a video signal and an audio signal when a microphone-equipped camera is used). As a communications line, for example, RS-232C and so forth are used, however, it is obvious that the present invention is not limited thereto.

A video communication terminal apparatus (video transmitter-receiver apparatus) 20 sends a control command to a desired camera controller 12-1, 12-2 or 12-3 through the camera input selector 14 to control one of the video cameras 10-1 to 10-3 connected to the selected camera controller. This video communication terminal apparatus 20 also transmits a video signal from the selected camera to a network, while it receives a video signal from the network. The video communication terminal apparatus 20 includes a central processing unit (CPU) 22 for controlling the whole of the apparatus 20, a main memory 24, a second memory unit 26 (for example, a hard disc unit), a mouse serving as a designating device, and a keyboard 30.

An input/output (I/O) port 32, which is connected to the camera input selector 14, supplies it with a camera control command. A video board 34 takes in the video signal from the video camera selected by the camera input selector 14, and displays various images on a bit-map display 35. A network interface 36 connects the video communication terminal apparatus 20 to a computer network or a communications network. The respective devices, namely, the CPU 22 to the video board 34 and the network interface 36, are mutually connected by a system bus 38. The network interface 36 enables the video communication terminal apparatus 20 to control a camera that is connected to a camera controller at a distant place by sending a control signal to the camera through the network, and to receive a camera control signal through the network.

The camera input selector 14 selects one control signal line and its video output from control signal lines connected to the camera control circuits 12-1 to 12-3 in order to supply the video board 34 with the selected video output, and logically connects the selected control line to the I/O port 32. As a video signal form, for example, the NTSC signal is used. The video board 34 takes in a video signal outputted from the camera input selector 14. The video signal taken in is displayed as a moving-image in a predetermined window on the bit-map display 35. The video board 34 also has the function of compressing or expanding the video signal.

In the second memory device 26, a variety of information related to the cameras 10-1 to 10-3 and other cameras connected to the apparatus 20 through the network, for example, camera position information data, camera figure data and so forth are stored.

When the camera input selector 14 is connected to only one of the video cameras 10-1 to 10-3, it does not need to be used. The corresponding camera controller 12 may be directly connected to the I/O port 32. When the video camera 10 is a type in which pan, tilt and so forth cannot be controlled, the camera control circuit 12 does not need to be used. When no video camera is used, in other words, when a video camera connected to another video communication terminal is operated by remote control to display only an image from the camera by using the video communication terminal apparatus 20, it is unnecessary to use any of the video cameras 10-1 to 10-3, any of the camera control circuits 12-1 to 12-3 and the camera input selector 14.

Figure 2:
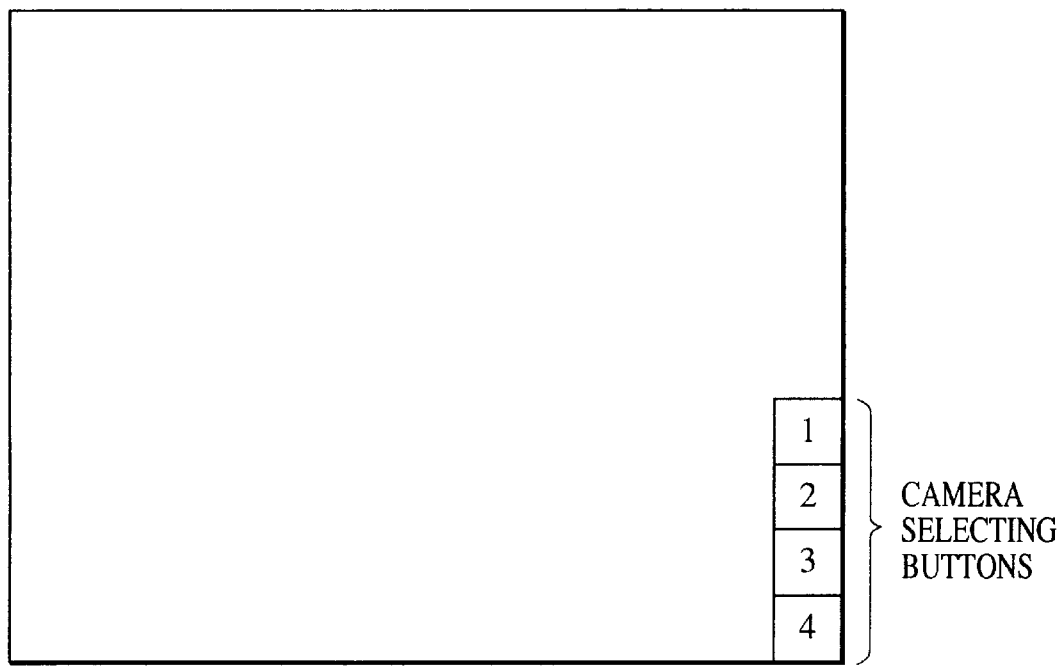
FIG. 2 is a schematic view illustrating a screen for displaying an image from a video transmission apparatus to which a plurality of cameras are connected.

FIG. 2 shows an example of the video display window displayed on the bit-map display 35 when the video communication terminal apparatus 20 is connected to four video cameras. In the bottom right corner of the display screen, buttons (camera selecting buttons) for selecting the cameras which output images to be displayed within the display screen are displayed in a small size. The user can select one specified camera for displaying an image by selecting one button from these buttons on the screen. A similar video display window is formed on the screen of another video communication terminal apparatus that receives an image from this video communication terminal apparatus and displays the received image. By operating camera selecting buttons on the screen at the receiving side, any of the video cameras connected to the transmitter's video communication terminal can be selected and its output image can be displayed on the screen of the receiver's video communication terminal apparatus.

Figure 3:
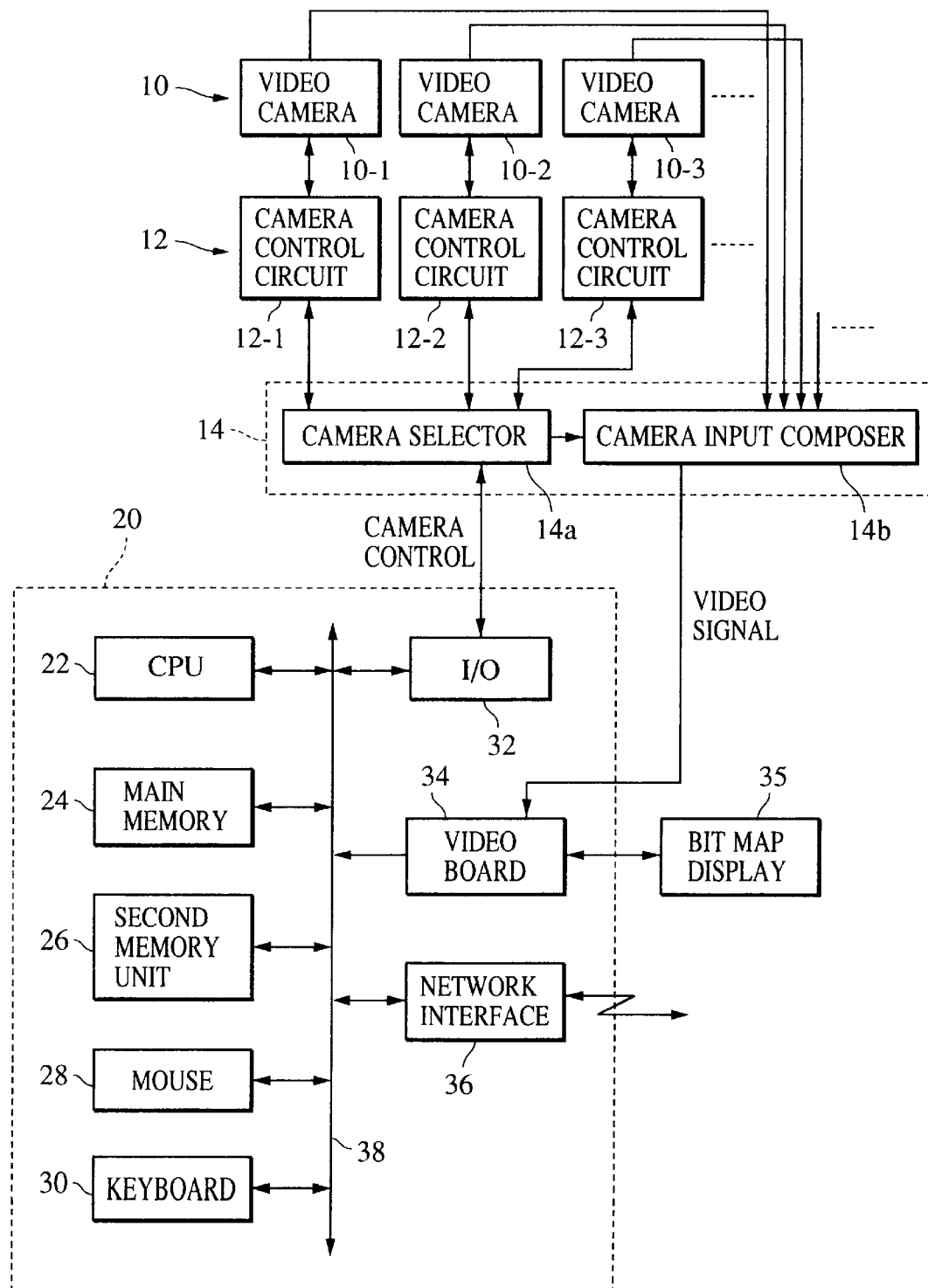
FIG. 3 is a block diagram showing a video communication terminal apparatus in which a camera input composer is included.

As shown in FIG. 3, the camera input selector 14 may include a camera selector 14A for selecting a video camera to be controlled and supplying the selected video camera with a camera control signal, and a camera input composer 14B for outputting a composite video signal from all video cameras 10-1 to 10-3 or from a plurality of selected video cameras or for outputting a video signal from one selected camera. In such a case, selecting video cameras to be controlled, and selecting video cameras from which images are inputted to the camera input composer 14B are independent of each other. To produce the composite image, there are two techniques, spatial composition in which images from a plurality of video cameras are combined on the same screen, and time-bases composition in which images from a plurality of video cameras are repeatedly changed over on a time-axis. In this embodiment both techniques can be selected.

Figure 4:
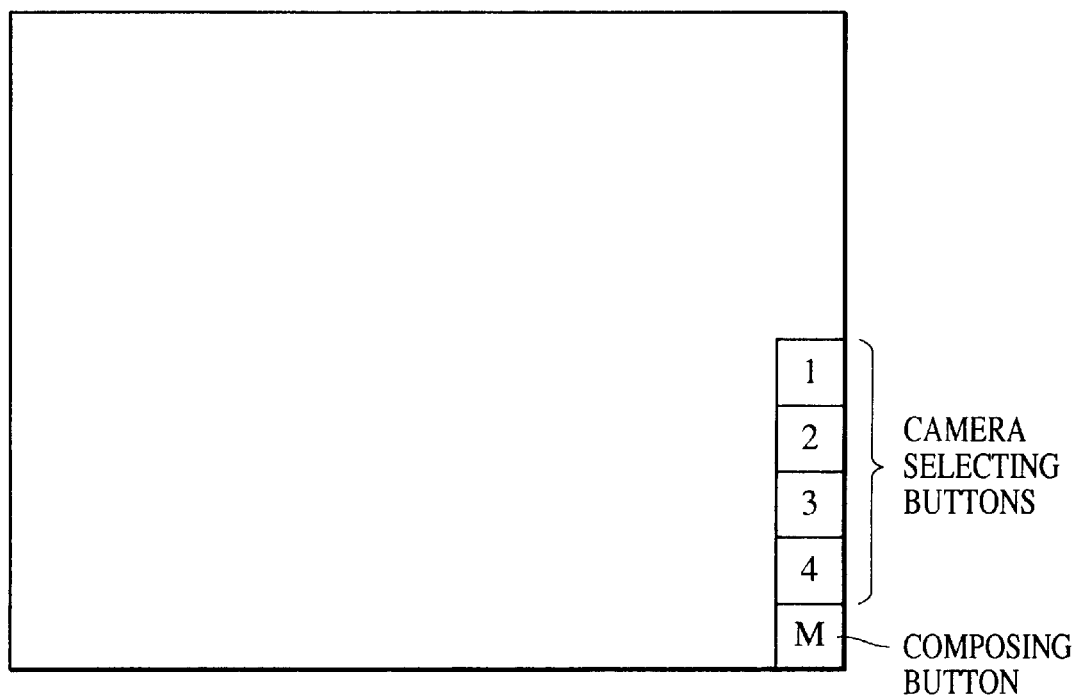
FIG. 4 is a schematic view illustrating a screen for displaying an image from the video transmission apparatus in which the camera input composer is included and to which the plurality of cameras are connected.
Figure 5:
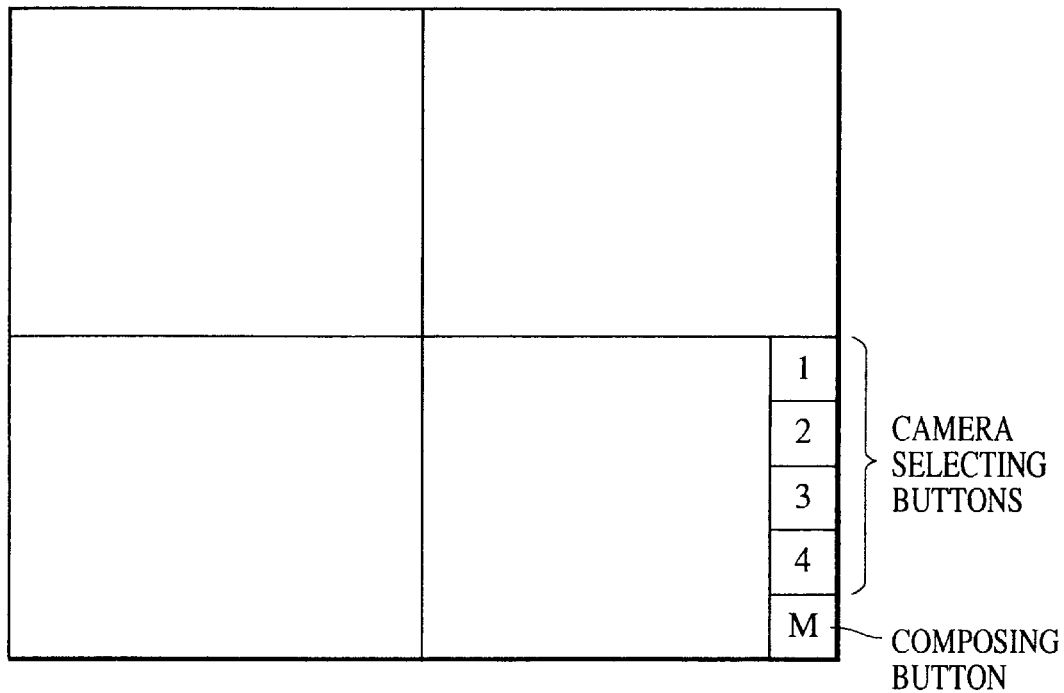
FIG. 5 is a schematic view illustrating a screen for displaying a composite image from the video transmission apparatus in which the camera input composer is included and to which the plurality of cameras are connected.

FIGS. 4 and 5 show examples of the video display screen corresponding to the embodiment shown in FIG. 3. FIG. 4 shows a condition of the screen on which an image from a single video camera is displayed, while FIG. 5 shows a condition of the screen on which a composite image of four images from four video cameras is displayed. In each condition, camera selecting buttons and a composing button for switching over the composite image display and the single-image full-screen display are displayed in the bottom right corner of the screen.

Figure 6:
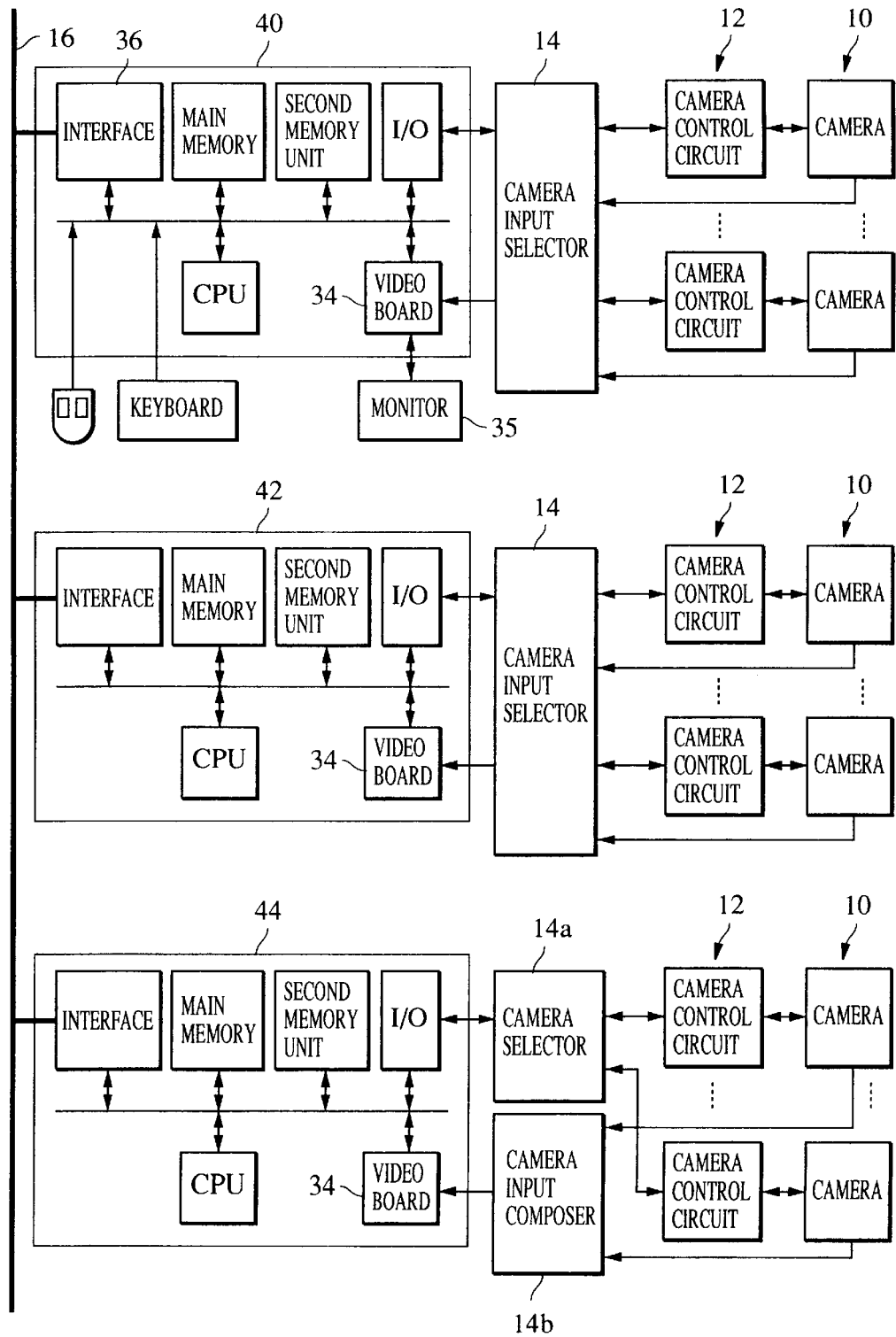
FIG. 6 is a block diagram showing the configuration of a network according to another embodiment of the present invention.

The video communication terminal apparatus shown in FIG. 1 or 3 is connected, as terminals 40, 42 and 44, to a computer network 46, as shown in FIG. 6. The terminal 40, which is a monitoring terminal operated by the user as an observer, can control video cameras connected to itself and video cameras connected to the whole terminals 42, 44 connected to the network 46. The terminal 40 also can display an image from any camera or images from any cameras. Although one monitoring terminal 40 is used in general, there is no problem if a plurality of monitoring terminals 40 are used.

Other terminals 42 and 44 are video transmission terminals for transmitting an image or images from one camera (or from a plurality of cameras connected to the terminals) to the monitoring terminals 40. Although the terminal 42 has a structure as shown in FIG. 1 and the terminal 44 has a structure as shown in FIG. 3, it need hardly be said that the number of cameras connected to each terminal may be only one. In accordance with the number of cameras required, at least one video transmission terminal is used as the video transmission terminals 42 and 44.

As the network 46, a local area network (LAN) or wide area network (WAN) that has a sufficient transmission bandwidth for transmitting both digital moving-image data and a camera control signal may be used. Such moving-image data may be transmitted with the data compressed. Since a variety of known methods can be utilized in this embodiment, a detailed description thereof will be omitted.

Video boards 34 in the monitoring terminal 40, the video transmission terminals 42 and 44 (having the function of video capture) supply video data taken in to bit-map displays 35 to display images. A network interface 36 in the monitoring terminal 40 transmits control commands, such as a camera switching command and an image composing command, to the network 46, with the control commands converted into packets. These pieces of information are transmitted to a specified terminal in accordance with the contents of data to be transmitted and the necessity. The video transmission terminals 42 and 44 compress video data using their video boards 34 to convert it into packets, and transmit the packet-converted data to the monitoring terminal 40.

On receiving the packet-converted video data from the video transmission terminal 42 or 44, the monitoring terminal 40 expands the received data using its video board 34 to display an image on the bit-map display 35, similar to the processing of its local video signal.

Figure 7:
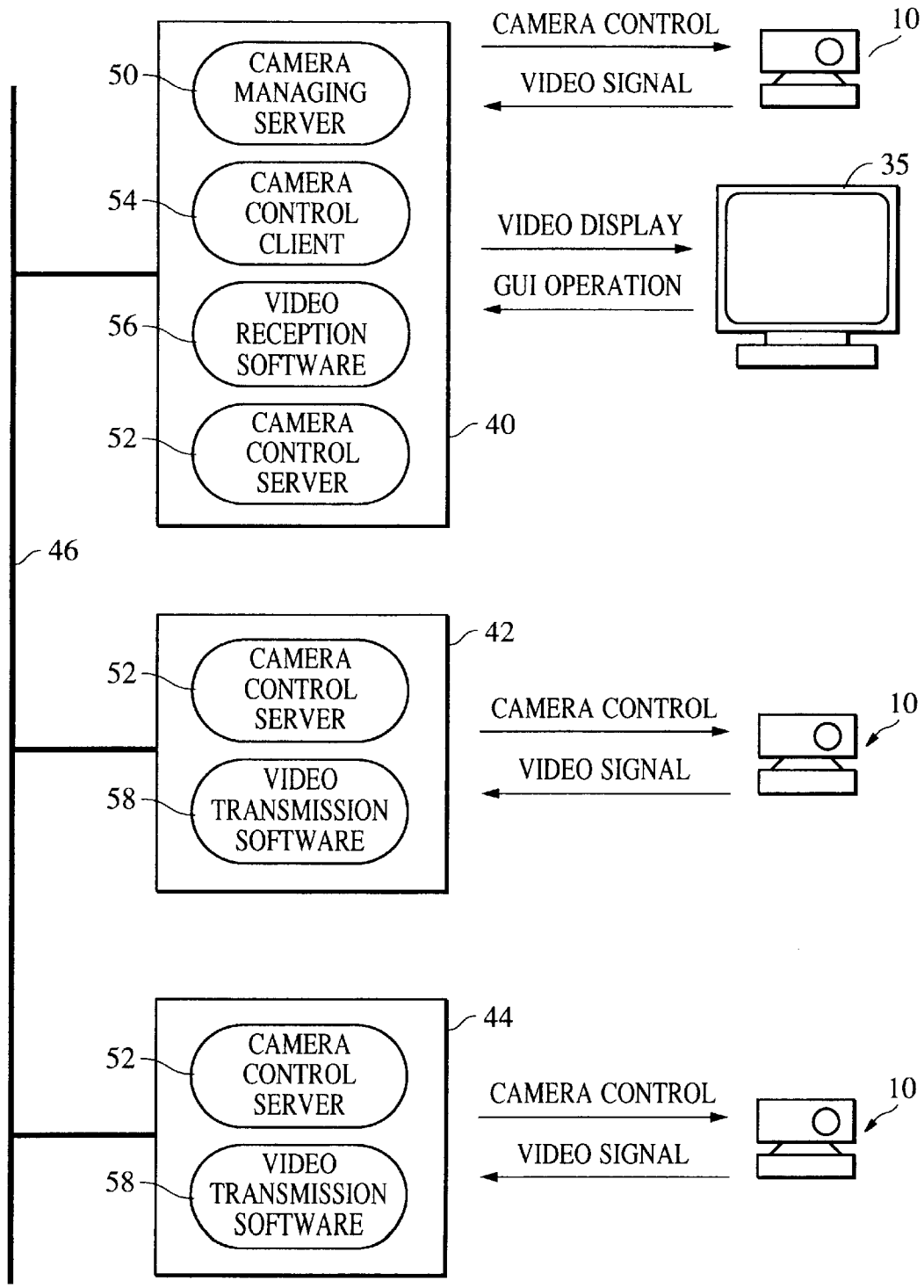
FIG. 7 is a block diagram showing the configuration of software according to the embodiment of the present invention.

FIG. 7 is a block diagram showing the configuration of software used in this embodiment. In the monitoring terminal 40, a camera managing server 50, a camera control server 52, a camera control client 54, and video reception software 56 are installed, while in the video transmission terminals 42 and 44, camera control servers 52 and video transmission software 58 are installed.

The camera managing server 50 is software to manage all the cameras, connected to the network 46, which can be utilized by the monitoring terminal 40. The camera managing server 50 holds static information related to the respective cameras, such as the names of the respective cameras, the names of hosts (the names of the terminals to which the cameras are connected), the locations at which the respective cameras are installed, whether or not the panning, tilting and zooming of the cameras can be controlled, and dynamic information representing the present condition as to whether or not the cameras are being controlled or images from the cameras are being displayed, and the names of the terminals provided with the function of video composing (for example, the camera input composer 14B). The camera managing server 50 also manages the registration of cameras which can be newly available through the network 46, the cancellation of cameras which has been separated from the network 46, and notifies the camera control client 54 of the management information of each camera, periodically or on demand.

The camera control server 52 is software to control the cameras which belong thereto, being instructed by the camera control client 54. The camera control server 52 displays the locations and directions where both the cameras connected to the monitoring terminal 40 and all the available cameras through the network 46 are installed so that predetermined corresponding camera symbols overlap with the map on the display screen of the monitoring terminal 40. The camera control client 54 also updates the form of the icon of each camera in real time, based on camera information sent from the camera managing server 50.

The video transmission software 58 compresses an image taken in the terminal, and transmits the compressed image to a demanding terminal (normally, the monitoring terminal 40). The video reception software 56 expands the transmitted, compressed image, and displays it on the bit-map display.

Figure 8:
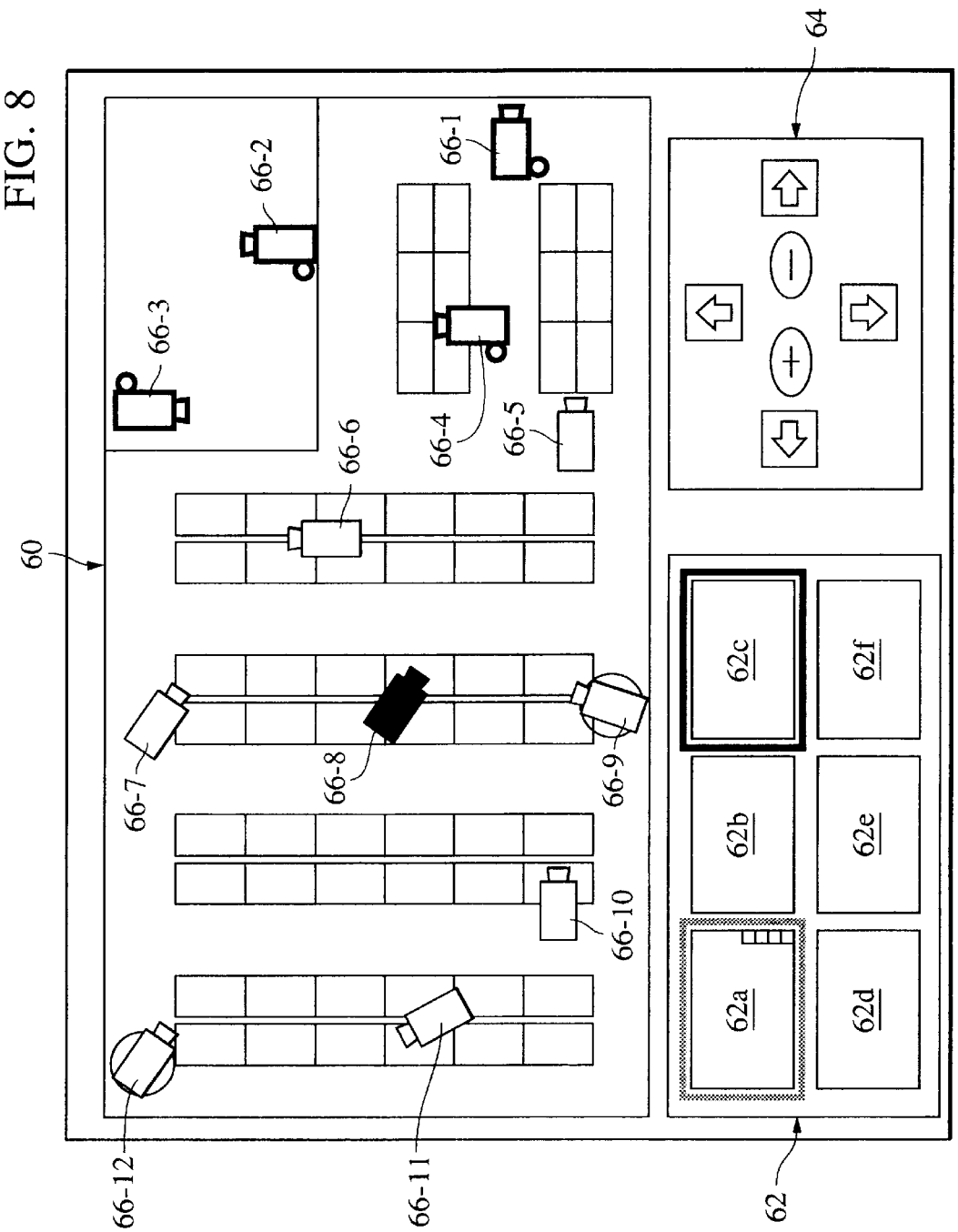
FIG. 8 is a plan view illustrating a camera display control panel which is displayed by a monitoring apparatus according to the present invention.

FIG. 8 shows a camera display control panel that is displayed on the bit-map display 35 of the monitoring terminal 40 by the camera control client 54. A map window 60 displays camera icons which represent the locations and directions where the respective cameras are installed so that the icons overlap with a map showing the places where the cameras being controlled are installed. A camera display window 62 displays an image from one selected camera or images from a plurality of selected cameras (images from a maximum of six video transmitters), and includes six video display regions 62A, 62B, 62C, 62D, 62E and 62F. A camera operation panel 64 is provided with various camera control buttons for operating the selected cameras to pan, tilt and zoom. On the bit-map display 35 of the monitoring terminal 40, a window display system that can simultaneously display a plurality of windows operates.

Figure 9:
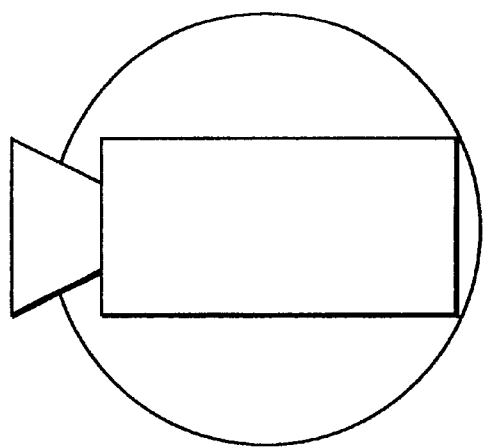
FIG. 9 is a chart showing a camera icon representing a camera that cannot be controlled.

A map that shows the arrangement of seats in an office or store is displayed on the map window 60, and on this map the camera icons 66-1 to 66-12 which correspond to the respective locations of cameras installed in such an office or store are displayed. The respective camera icons 66-1 to 66-12 are displayed at the appropriate positions corresponding to the locations of the cameras, almost in the same directions as the cameras are actually directed. The cameras corresponding to the camera icons 66-9 and 66-12 cannot be externally controlled, which condition is represented by the form of each icon shown in FIG. 9. The camera icon corresponding to a camera from which an image is being displayed on the video display window 62 is displayed by the camera control client 54 so that the frame of the icon is yellow.

The operation of the camera display control panel shown in FIG. 8 and how the panel is used will be described below. By selecting one icon from the camera icons 66-1 to 66-12 on the map window 60 (for example, by clicking the icon 66-1 with a mouse), the camera corresponding to the selected icon is regarded as selected, and the frame color of the icon 661 is changed to yellowish green by the camera control client 54. The camera control client 54 queries the camera managing server 50 about information related to the camera corresponding to the selected camera icon 66-1. The camera managing server 50 makes reference to the name of the camera queried, and confirms whether or not another camera connected to the same host (video transmission terminal apparatus 20) is used. In other words, the camera managing server 50 looks up whether or not another camera connected to the camera input selector 14 for the same host to which the selected camera is connected is used, and notifies the camera control client 54 of the result. The camera managing server 50 simultaneously confirms whether or not the host corresponding to the selected camera is provided with the camera input composer 14B. If the host is provided with the camera input composer 14B, the camera managing server 50 notifies the camera control client 54 of its presence.

Figure 10:
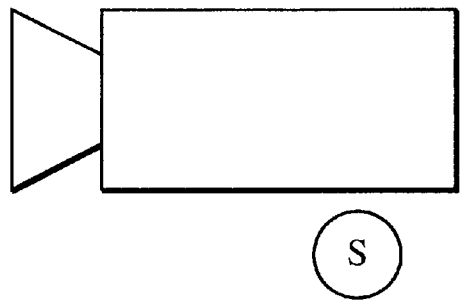
FIG. 10 is a chart showing a camera icon representing a plurality of cameras connected to the same host.
Figure 11:
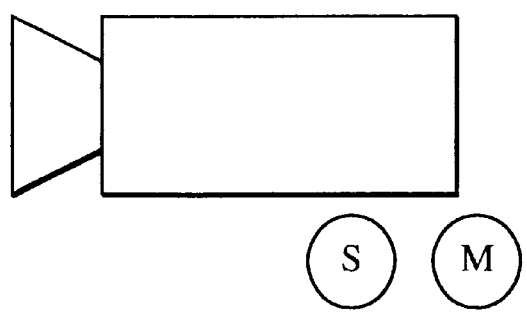
FIG. 11 is a chart showing a camera icon representing a camera connected to the camera input composer.

The camera control client 54 changes each form of the camera icons corresponding to all the cameras connected to the same host to which the early selected camera is connected, into a form shown in FIG. 10 when the host is not provided with the camera input composer 14B. The camera control client 54 changes each form into a form shown in FIG. 11 when the host is provided with the camera input composer 14B. The frames of the camera icons in both cases are changed to be yellowish green. While the image from the camera corresponding to the icon 66-1 is being displayed in one of the video display regions 62A to 62F of the video display window 62, the camera control client 54 also changes the frame color of the video display region to yellowish green.

For example, when the cameras corresponding to the camera icons 66-1, 66-2, 66-3 and 66-4 are connected to the same host which is not provided with the camera input composer 14B, the camera control client 54 changes each form of the camera icons 66-1, 66-2, 66-3 and 66-4 into the form shown in FIG. 10, which form has been already shown in FIG. 8, and displays the frames of the changed camera icons in yellowish green. While the image from the camera corresponding to the selected camera icon 66-1 is being displayed in the video display region 62A of the video display window 62, the camera control client 54 displays the frame surrounding the video display region 62A in yellowish green, as shown in FIG. 8.

Figure 12:
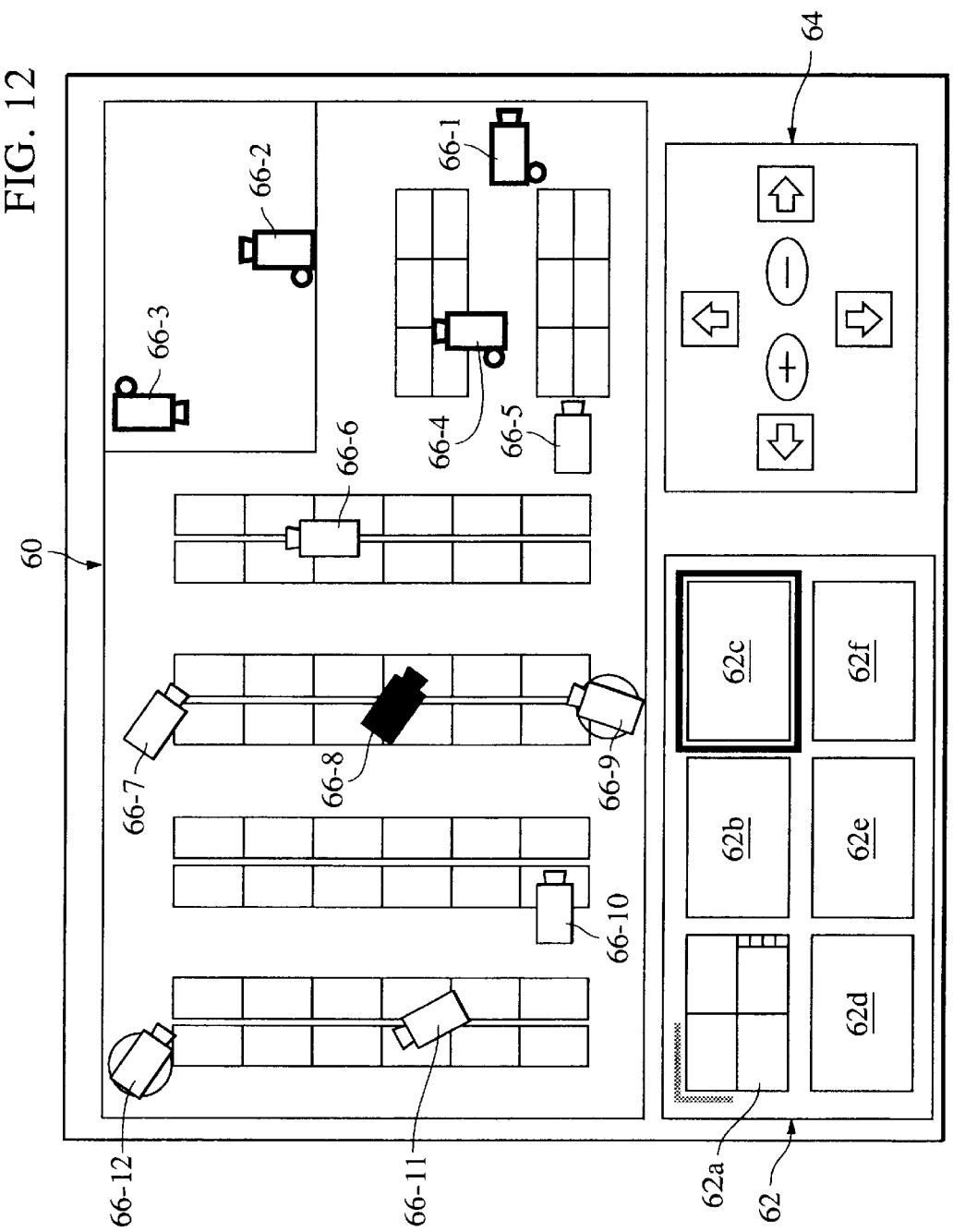
FIG. 12 is a plan view illustrating a camera display control panel, including a composite image, which panel is displayed by the monitoring apparatus.
Figure 13:
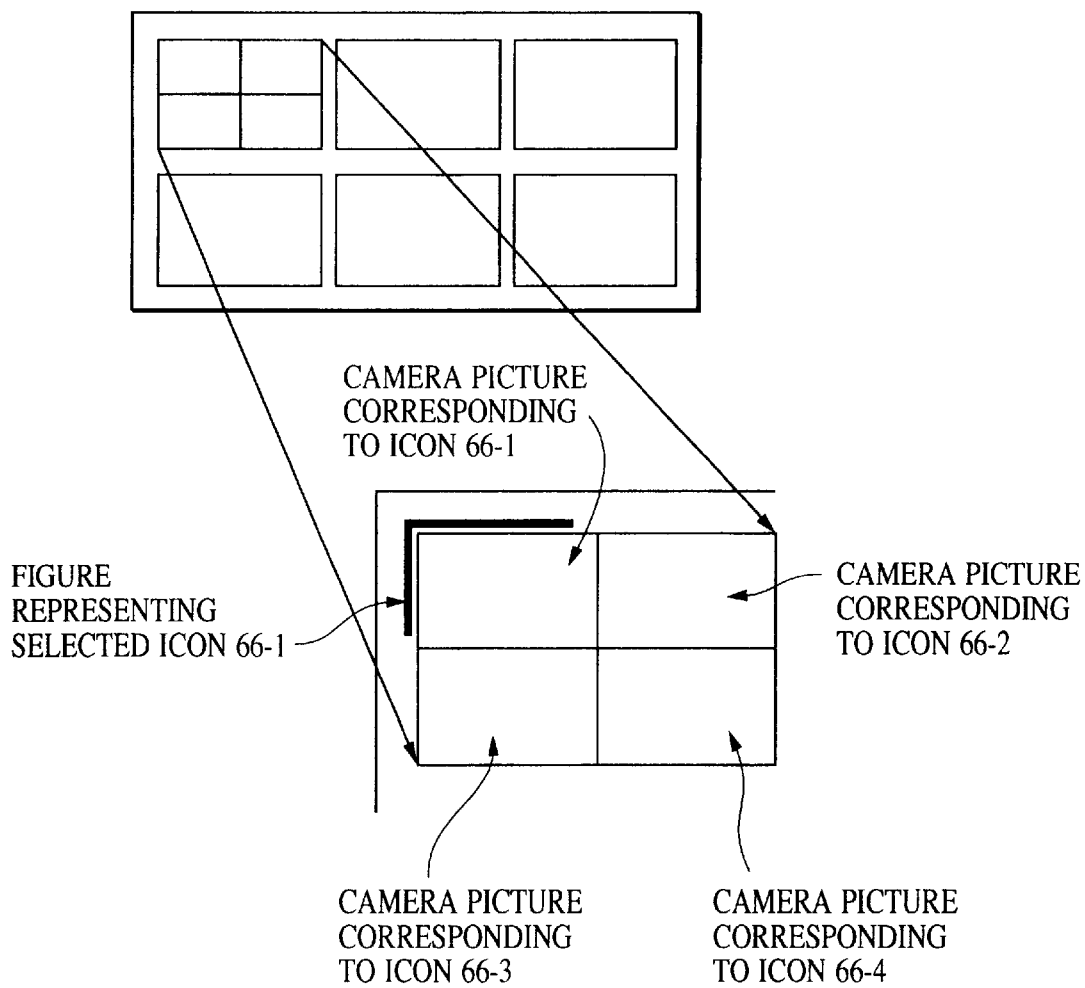
FIG. 13 is a partially enlarged chart showing part of the composite image shown in FIG. 12.

FIG. 12 shows an example of the screen obtained when the camera corresponding to the selected camera icon (in this case the icon 66-1) is connected to the host provided with the camera input composer 14B. The camera control client 54 changes each form of the camera icons 66-1, 66-2, 66-3 and 66-4 into the form shown in FIG. 11, and displays the changed icon frame in yellowish green. As shown in FIG. 12, the composite image of images from four cameras connected to the host to which the camera corresponding to the camera icon 66-1 is connected is displayed in the video display region 62A of the video display window 62. Camera selecting buttons and composing buttons (as shown in FIGS. 4 and 5) are displayed in the bottom right corner of the video display region 62A. In accordance with the selection of the camera icon 66-1, the camera control client 54 displays an L-shaped yellowish green frame along the periphery of a portion of the video display region 62A, in which portion the image from the camera corresponding the camera icon 66-1 is displayed. An enlarged view of the portion of the video display region 62A is shown in FIG. 13.

Such displayed camera icons on the map enable the observer to easily grasp which cameras are connected to the same host to which the selected camera is connected. In addition, when the host is provided with the camera input composer, the display conditions of the camera icons are different, thus, the observer can easily grasp both a type of cameras by which a composite image of reduced images can be displayed and another type of camera by which a composite image of reduced images cannot be displayed.

In order to select a camera from which an image needs to be displayed on the video display window 62, the camera icon corresponding to this camera may be dragged and dropped on the video display window 62. For example, when the selected camera is represented by the camera icon 66-2, the camera control client. 54 queries the camera managing server 50 about whether or not an image from a camera connected to the same host to which the camera represented by the icon 66-2 is being displayed.

If an image from a camera connected to the same host is being displayed, for example, while the image from the camera represented by the camera icon 66-1 is being displayed, the camera control client 54 sends the host a camera switching command for switching the camera to the camera represented by the camera icon 66-2 so that the host transmits the image from the camera represented by the camera icon 66-2, and then displays the transmitted image from the camera represented by the camera icon 66-2 in the video display region (for example, 62A) where the image from the camera represented by the camera icon 66-1 is displayed.

While the image from the camera connected to the same host is not being displayed, the camera control client 54 displays the image from the camera corresponding to the camera icon 66-2 in the display region where no image is displayed. At this time, the camera control client 54 looks up the host that is provided with the camera corresponding to the camera icon 66-2, and if another camera connected to the host is detected, camera selecting buttons are displayed in the video display region in which the image from the camera corresponding to the camera icon 66-2 are displayed, as shown in FIG. 2.

When an image is further displayed among the video display regions 62A to 62F of the video display window 62, or when a camera from which an image is being displayed has been switched to another camera, the camera control managing server 50 updates the list of the names of the cameras from which images are being displayed, and the camera control client 54 changes the frames of camera icons corresponding to camera names included in the camera name list to be yellow.

By selecting one image from the images displayed in the video display regions 62A to 62F of the video display window 62 (for example, by clicking with the mouse), or by double clicking any camera icon on the map window 60, the camera operation panel 64 is displayed. With respect to each of the video display regions 62A to 62F for displaying an image from the camera corresponding to the activated camera operation panel, a red frame surrounding the region is displayed to represent a camera control condition. The color of the camera icon corresponding to the camera being controlled is also changed to red.

In the foregoing embodiments the display forms of the camera icons are changed in accordance with whether or not the cameras are controlled, whether or not the cameras are connected to the same host (video communication terminal apparatus 20), and whether or not the cameras are connected to the same camera input composer. However, for example, the brightness of the camera icons corresponding to cameras which cannot be controlled may be changed such that the colors of the camera icons are darkened, or the display colors of the camera icons are differentiated. Similarly, although the camera icons corresponding to cameras from which images are displayed are discriminated based on their frame colors, the forms of the camera icons may be changed. The camera icons may be modified by combining colors and forms so that the observer can easily discriminate the icons.

Further, it is obvious that the present invention may be applied to a system formed by a plurality of apparatuses or an apparatus formed by a single unit. In addition, the present invention may be applied by providing a system or apparatus with software. In such a case a storage medium in which software for using the present invention is stored is a main component of the present invention. The system or apparatus operates in a predetermined manner by the software read from the storage medium thereto.

As easily understood from the foregoing description, in accordance with the above embodiments, the camera icons displayed on the map enable the observer to easily grasp the relationship between the cameras represented by the camera icons and the images being displayed on the video display screen.

In addition, the cameras which can be externally controlled to pan, tilt and zoom, and the cameras which cannot be externally controlled are discriminated by using the camera icons.

Further, the camera icons on the map enable the observer to recognize which camera is connected to the same video transmission apparatus to which the selected camera is connected, and to recognize which cameras are connected to the same camera input composer. Accordingly, the operability of the system is extremely improved.

As described above, in accordance with the above embodiments, camera information can be displayed by using the camera icons on the map so that the observer can easily understand the information.

The individual components shown in outline are designated by blocks in the Drawings are all well-known in the camera control arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for controlling a plurality of cameras connected to a network, and for displaying images from said plurality of cameras, said system including:
    map display means for displaying locations at which said plurality of cameras are disposed;
    symbol display means for displaying symbols representing said plurality of cameras in accordance with the locations at which said plurality of cameras are disposed so that said symbols overlap the map displayed by said map display means;
    image display means for displaying each of the images from the plurality of cameras on the screen on which said map is displayed;
    camera selecting means for selecting a camera to control at least one of panning, tilting, and zooming by designating a desired image from the images displayed by said image display means; and
    control means for controlling a display of, in distinguishable forms, (i) a symbol corresponding to the camera to be controlled and selected by said camera selecting means and (ii) another symbol corresponding to another camera, and for controlling a display of, in distinguishable forms, (iii) an image from the camera to be controlled and selected by said camera selecting means and (iv) an image from the another camera.

2. A system according to claim 1, wherein said control means controls said symbol display means to display said symbols in different forms in accordance with whether or not said plurality of cameras are connected to a video transmission terminal which transmits the images selectively from said plurality of images.

3. A system according to claim 1, wherein said control means controls said symbol display means to display said symbols in different forms in accordance with whether or not said plurality of cameras are connected to a video transmission terminal which includes a camera input composing means which composes images from a plurality of cameras.

4. A system according to claim 1, wherein said control means controls said symbol display means to display said symbols in different forms in accordance with whether or not said cameras are externally controllable.

5. A system according to claim 1, wherein said control means controls said symbol display means to display (i) first symbols representing cameras from which images are displayed and (ii) second symbols representing cameras from which images are not displayed, said first and second symbols having different forms.

6. A system according to claim 1, wherein said control means changes colors of said symbols so that said symbols are displayed in said different forms.

7. A system according to claim 1, wherein said control means changes brightness of said symbols so that said symbols are displayed in said different forms.

8. A system according to claim 1, wherein said control means changes the shapes of said symbols so that said symbols are displayed in said different forms.

9. A method for controlling a plurality of cameras connected to a network, comprising the steps of:
    displaying a map showing locations at which said plurality of cameras are disposed;
    displaying said symbols representing said plurality of cameras in accordance with the locations at which said plurality of cameras are disposed so that said symbols overlap the map displayed by the map displaying step, and displaying said symbols in different forms in accordance with different conditions of said plurality of cameras;

displaying each of the images from the plurality of cameras on the screen on which said map is displayed;

selecting a camera to control at least one of panning, tilting and zooming by designating a desired image from the images displayed; and controlling a display of, in distinguishable forms, (i) a symbol corresponding to the camera to be controlled and selected by said camera selecting means and (ii) another symbol corresponding to another camera, and for controlling a display of, in distinguishable forms, (iii) an image from the camera to be controlled and selected by said selecting step and (iv) an image from the another camera.

10. A method according to claim 9, wherein said symbols displaying step displays the symbols in different forms in accordance with whether or not said plurality of cameras are connected to a video transmission terminal which transmits the images selectively from the plurality of images.

11. A method according to claim 9, wherein said symbols displaying step displays the symbols in different forms in accordance with whether or not the plurality of cameras are connected to a video transmission terminal which includes a camera input composing means which composes images from a plurality of cameras.

12. A method according to claim 9, wherein said symbols displaying step displays the symbols in different forms in accordance with whether or not said cameras are externally controllable.

13. A method according to claim 9, wherein said symbols displaying step displays (i) first symbols representing cameras from which images are displayed and (ii) second symbols from which images are not displayed are displayed, said first and second symbols having different forms.

14. A method according to claim 9, wherein the symbol displaying step displays symbols of different colors so that said symbols are displayed in said different forms.

15. A method according to claim 9, wherein the symbol displaying step displays symbols of different brightness so that said symbols are displayed in said different forms.

16. A method according to claim 9, wherein the symbol displaying step displays symbols of different shape so that said symbols are displayed in said different forms.

17. A computer-readable medium for storing programs to control a plurality of cameras connected to a network, said programs causing a computer to generate a display map showing (i) locations at which said plurality of cameras are disposed and (ii) symbols representing said plurality of cameras in accordance with the locations in which said plurality of cameras are disposed so that said symbols overlap the display map, said programs causing the computer to generate the display map to display said symbols in different forms in accordance with different conditions of said cameras, said programs causing the computer to perform the functions of:

displaying each of the images from the plurality of cameras on the screen on which said map is displayed;

selecting a camera to control at least one of panning, tilting, and zooming by designating a desired image from the images displayed by the image display step; and controlling a display of, in distinguishable forms, (i) a symbol corresponding to the camera to be controlled and selected by the camera selecting step and (ii) another symbol corresponding to another camera, and for controlling a display of, in distinguishable forms, (iii) an image from the camera to be controlled and selected by said selecting step and (iv) an image from the another camera.

18. A system according to claim 1, wherein said control means controls said symbol display means to display said symbols in different forms in accordance with whether one or a plurality of cameras are connected to a video transmission terminal.

19. A method according to claim 9, further comprising the step of displaying said symbols in different forms in accordance with whether one or a plurality of cameras are connected to a video transmission terminal.

20. A system for controlling a plurality of cameras connected to a network, and for displaying images from said plurality of cameras, said system including:

map display means for displaying locations at which said plurality of cameras are disposed;

symbol display means for displaying symbols representing said plurality of cameras in accordance with the locations at which said plurality of cameras are disposed so that said symbols overlap the map displayed by said map display means; and control means for controlling said symbol display means to display a first camera symbol in a first form when a corresponding first one of the plurality of cameras is coupled to a first host, and to display a second camera symbol in a second, different form when a corresponding second one of the plurality of cameras is not coupled to the first host.

21. A system according to claim 20, wherein said control means controls said symbol display means to display said symbols in different forms in accordance with whether or not a camera input composing means is connected to a video transmission terminal to which said cameras are connected.

22. A system according to claim 20, wherein said control means changes colors of said symbols so that said symbols are displayed in said different forms.

23. A system according to claim 20, wherein said control means changes brightness of said symbols so that said symbols are displayed in said different forms.

24. A method for controlling a plurality of cameras connected to a network, and for displaying images from said plurality of cameras, including the steps of:

a map display step for displaying locations at which said plurality of cameras are disposed;

a symbol display step for displaying symbols representing said plurality of cameras in accordance with the locations at which said plurality of cameras are disposed so that said symbols overlap the map displayed by said map display step; and a control step for controlling said symbol display step to display a first camera symbol in a first form when a corresponding first one of the plurality of cameras is coupled to a first host, and to display a second camera symbol in a second, different form when a corresponding second one of the plurality of cameras is not coupled to the first host.

25. A method according to claim 20, wherein said control step controls said symbol display step to display said symbols in different forms in accordance with whether or not a camera input composing means is connected to a video transmission terminal to which said cameras are connected.

26. A method according to claim 20, wherein said control step changes colors of said symbols so that said symbols are displayed in said different forms.

27. A method according to claim 20, wherein said control step changes brightness of said symbols so that said symbols are displayed in said different forms.

28. A method according to claim 20, wherein said control step changes the shapes of said symbols so that said symbols are displayed in said different forms.

29. A computer readable medium storing a program which controls a plurality of cameras connected to a network, and causes images from said plurality of cameras to be displayed, said program causing the following functions to be performed:

a map display function for displaying locations at which said plurality of cameras are disposed;

a symbol display function for displaying symbols representing said plurality of cameras in accordance with the locations at which said plurality of cameras are disposed so that said symbols overlap the map displayed by said map display means; and a control function for controlling said symbol display means to display a first camera symbol in a first form when a corresponding first one of said plurality of cameras is coupled to a first host, and to display a second camera symbol in a second, different form when a corresponding second one of the plurality of cameras is not coupled to the first host.

30. A system for controlling plurality of cameras connected to a network, and for displaying images from said plurality of cameras, said system including:

map display means for displaying on a map locations at which said plurality of cameras are disposed;

symbol display means for displaying symbols representing said plurality of cameras in accordance with the locations at which said plurality of cameras are disposed so that said symbols overlap the map displayed by said map display means;

image display means for displaying each of the images from the plurality of cameras on the screen on which said map is displayed;

camera selecting means for selecting a camera to control at least one of panning, tilting, and zooming by designating a symbol on the map;

control means for displaying, in distinguishable forms, (i) an image from the camera to be controlled and selected by said camera selecting means and (ii) an image from another camera, and for displaying, in distinguishable forms, (iii) a symbol corresponding to the camera to be controlled and selected by said camera selecting means, and (iv) another symbol corresponding to the another camera.

31. A system for controlling plurality of cameras connected to a network, and for displaying images from said plurality of cameras, said system including:

a map display step for displaying on a map locations at which said plurality of cameras are disposed;

a symbol display step for displaying symbols representing said plurality of cameras in accordance with the locations at which said plurality of cameras are disposed so that said symbols overlap the map displayed by said map display step;

an image display step for displaying each of the images from the plurality of cameras on the screen on which said map is displayed;

a camera selecting step for selecting a camera to control at least one of panning, tilting, and zooming by designating a symbol on the map;

a control step for displaying, in distinguishable forms, (i) an image from the camera to be controlled and selected by said camera selecting step and (ii) an image from another camera, and for displaying, in distinguishable forms, (iii) a symbol corresponding to the camera to be controlled and selected by said camera selecting step, and (iv) another symbol corresponding to the another camera.

32. A computer-readable medium for storing programs to control a plurality of cameras connected to a network, said programs causing at least one computer to perform the steps of:

a map display, step for displaying on a map locations at which said plurality of cameras are disposed;

a symbol display step for displaying symbols representing said plurality of cameras in accordance with the locations at which said plurality of cameras are disposed so that said symbols overlap the map displayed by said map display step;

an image display step for displaying each of the images from the plurality of cameras on the screen on which said map is displayed;

a camera selecting step for selecting a camera to control at least one of panning, tilting, and zooming by designating a symbol on the map;

a control step for displaying, in distinguishable forms, (i) an image from the camera to be controlled and selected by said camera selecting step and (ii) an image from another camera, and for displaying, in distinguishable forms, (iii) a symbol corresponding to the camera to be controlled and selected by said camera selecting step and (iv) another symbol corresponding to the another camera.

33. A system for controlling a plurality of cameras connected to a network, and for displaying images from said cameras, said system including:

map display means for displaying locations at which said plurality of cameras are disposed;

symbol display means for displaying symbols representing said plurality of cameras in accordance with the locations at which said plurality of cameras are disposed so that said symbols overlap the map displayed by said map display means;

image display means for displaying each of the images from the plurality of cameras on the screen on which said map is displayed;

camera selecting means for selecting a camera to control at least one of panning, tilting, and zooming; and control means for controlling a display of, in distinguishable forms, (i) a symbol corresponding to the camera to be controlled and selected by said camera selecting means and (ii) another symbol corresponding to another camera, and for controlling a display of, in distinguishable forms, (iii) an image from the camera to be controlled and selected by said camera selecting means and (iv) an image from the another camera.

34. A method for controlling a plurality of cameras connected to a network, comprising the steps of:

displaying a map showing locations at which said plurality of cameras are disposed;

displaying said symbols representing said plurality of cameras in accordance with the locations at which said plurality of cameras are disposed so that said symbols overlap the map displayed by the map displaying step, and displaying said symbols in different forms in accordance with different conditions of said cameras;

displaying each of the images from the plurality of cameras on the screen on which said map is displayed;

selecting a camera to control at least one of panning, tilting and zooming; and control means for controlling a display of, in distinguishable forms, (i) a symbol corresponding to the camera to be controlled and selected by said camera selecting means and (ii) another symbol corresponding to another camera, and for controlling a display of, in distinguishable forms, (iii) an image from the camera to be controlled and selected by said camera selecting step and (iv) an image from the another camera.

35. A computer-readable medium for storing programs to control a plurality of cameras connected to a network, said programs causing a computer to generate a display map showing (i) locations at which said plurality of cameras are disposed and (ii) symbols representing said plurality of cameras in accordance with the locations in which said plurality of cameras are disposed so that said symbols overlap the display map, said programs causing the computer to generate the display map to display said symbols in different forms in accordance with different conditions of said plurality of cameras, said programs causing the computer to perform the functions of:

displaying each of the images from the plurality of cameras on the screen on which said map is displayed;

selecting a camera to control at least one of panning, tilting, and zooming; and controlling a display of, in distinguishable forms, (i) a symbol corresponding to the camera to be controlled and selected by the camera selecting step and (ii) another symbol corresponding to another camera, and controlling a display of, in distinguishable forms, (iii) an image from the camera to be controlled and selected by said camera selecting step and (iv) an image from the another camera.

* * * * *

UNITED STATES PATENT AND TRADEMARK OFFICE
CERTIFICATE OF CORRECTION

PATENT NO. : 6,002,995
DATED : December 14, 1999
INVENTOR(S) : Kazuko Suzuki

It is certified that error appears in the above-identified patent and that said Letters Patent is hereby corrected as shown below:

COLUMN 1
  Line 34, "location" should read --location- --.

COLUMN 5
  Line 11, "time-bases" should read --time-based--.

COLUMN 7
  Line 19, "661" should read --66-1--.

COLUMN 13
  Line 26, "plurality" should read --a plurality--; and
  Line 51, "plurality" should read --a plurality--.

COLUMN 14
  Line 13, "display," should read --display--.

Signed and Sealed this

Thirteenth Day of February, 2001

Attest:

NICHOLAS P. GODICI

Attesting Officer     Acting Director of the United States Patent and Trademark Office